(12) United States Patent
Ohzono (10) Patent No.: US 7,841,641 B2
(45) Date of Patent: Nov. 30, 2010

(54) STRADDLE TYPE VEHICLE

(75) Inventor: Gen Ohzono, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 196 days.

(21) Appl. No.: 12/175,285

(22) Filed: Jul. 17, 2008

(65) Prior Publication Data

US 2009/0021038 A1    Jan. 22, 2009

(30) Foreign Application Priority Data

Jul. 19, 2007    (JP) .............................. 2007-188740

(51) Int. Cl.
*B62J 17/00*    (2006.01)

(52) U.S. Cl. ...................... 296/78.1; 296/1.08; 40/591; 40/911

(58) Field of Classification Search ................ 296/191, 296/78.1, 1.05, 1.06, 1.08; 40/643, 644, 40/591, 911, 201, 209; 220/DIG. 19
See application file for complete search history.

(56) References Cited

U.S. PATENT DOCUMENTS

| | | | | |
|---|---|---|---|---|
| 3,200,524 A | * | 8/1965 | Hendrickson | 362/496 |
| 5,547,306 A | * | 8/1996 | Zakrajsek | 403/202 |
| 6,182,691 B1 | * | 2/2001 | DeCaluwe | 137/556.3 |
| 6,910,705 B1 | * | 6/2005 | Harwood et al. | 280/507 |
| 6,986,918 B2 | * | 1/2006 | Jacobs | 428/14 |
| 7,389,600 B2 | * | 6/2008 | Baker et al. | 40/473 |
| 2007/0124972 A1 | * | 6/2007 | Ratcliffe | 40/591 |
| 2008/0143132 A1 | * | 6/2008 | Okuda | 296/1.08 |
| 2009/0000170 A1 | * | 1/2009 | Capuzzi | 40/643 |
| 2009/0174204 A1 | * | 7/2009 | Robertson | 296/1.08 |
| 2009/0256372 A1 | * | 10/2009 | Nedelman | 296/1.08 |

FOREIGN PATENT DOCUMENTS

JP    2002274253 A    9/2002

* cited by examiner

*Primary Examiner*—Jason S Morrow
(74) *Attorney, Agent, or Firm*—Keating & Bennett, LLP (57) ABSTRACT

A straddle-type vehicle has a decorative member that a user can repeatedly use and that is utilized for a purpose other than design. The decorative member covers a fastening part of an exterior cover of the vehicle and has a lid with a decorated exterior surface. A base is attached to the exterior cover to support the lid. The lid is attached to the exterior cover via the base, and removal of the lid from the exterior cover is restricted by assembly of the base in the exterior cover.

18 Claims, 14 Drawing Sheets

STRADDLE TYPE VEHICLE

RELATED APPLICATIONS

This application claims the benefit of priority under 35 USC 119 of Japanese patent application no. 2007-188740, filed on Jul. 19, 2007, which application is hereby incorporated by reference in its entirety.

BACKGROUND OF THE INVENTION

1. Field of the Invention

The present invention relates to a straddle-type vehicle and in particular relates to a straddle-type vehicle having an exterior cover to which a decorative member is attached.

2. Description of Related Art

Some straddle-type vehicles have a decorative member with a logo in which a manufacturer name, a vehicle name, or the like (a so-called emblem) is attached on an exterior cover. The decorative member attached on a vehicle is a symbol indicating a manufacturer, a brand, or the like at a glance. In general, such a decorative member is attached on a conspicuous position of an exterior cover by a fixing means such as an adhesive or a double-sided tape. A straddle-type vehicle provided with a decorative member of this type is disclosed, for example, in JP-A-2002-274253.

However, a conventional decorative member merely expresses a characteristic of vehicle design and is not positively utilized for a purpose other than design. Moreover, a decorative member with a removable mounting structure is desirable so that it can be used repeatedly and users can attach a decorative member according to their preference.

SUMMARY OF THE INVENTION

The present invention provides a straddle-type vehicle having a decorative member that a user can repeatedly use and that is utilized for a purpose other than design.

One aspect of the present invention is a straddle-type vehicle including an exterior cover. A decorative member covers a fastening part of the exterior cover and includes a lid having a decorated exterior surface and a base attached to the exterior cover to support the lid. The lid is attached to the exterior cover via the base, and removal of the lid from the exterior cover is restricted by assembly of the base in the exterior cover.

In one embodiment, a guide pin inserted in the exterior cover is formed on a back side of the lid, and a restricting member for restricting removal of the guide pin is formed on the base.

In one embodiment, the exterior cover has a guide groove in which the guide pin is slidably inserted. The guide groove comprises a narrow groove having a width restricting removal of the guide pin, and a wide groove having a width permitting removal of the guide pin. An insertion covering the wide groove of the guide groove is formed on the base.

In one embodiment, the base has a base groove in which the guide pin is slidably inserted. The base groove comprises a narrow groove having a width restricting removal of the guide pin, and a wide groove having a width permitting removal of the guide pin. The wide groove of the base groove and the wide groove of the guide groove are formed in positions away from each other in a sliding direction of the guide pin.

In one embodiment, the base has a height such that the lid does not contact the exterior cover when the guide pin slides.

In one embodiment, the fastening part of the exterior cover is constituted such that a fastening member can pass through the exterior cover and a body frame of the vehicle, and the fastening member is covered with the lid.

In one embodiment, the base is fixed on the exterior cover by a fastening member attached by using a tool.

In one embodiment, the guide pin is slidably inserted along a vertical direction of the vehicle.

In one embodiment, the base comprises a vibration isolation member.

The straddle-type vehicle according to the present invention thereby includes a decorative member covering a fastening part of an exterior cover. Since the fastening part of the exterior cover is covered with the decorative member, the fastening part is protected against rust and the like and the design of the vehicle is excellent.

Further, the decorative member of the present invention includes a lid having a decorated exterior surface and a base for supporting the lid. The lid is attached to the exterior cover via the base, and removal of the lid from the exterior cover is restricted by assembly of the base in the exterior cover. As a result, the lid does not easily come off to expose the fastening part and the fastening part is thereby protected. In addition, the base must be removed from the exterior cover to release the restriction on removal of the lid. Consequently, it is complicated to remove the lid and theft of the decorative member is prevented.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Embodiments of the present invention are now described with reference to the accompanying drawings. In the drawings, members effecting the same operation are referred to with the same reference numerals and symbols. The present invention is not limited to the embodiments described below.

Figure 1:
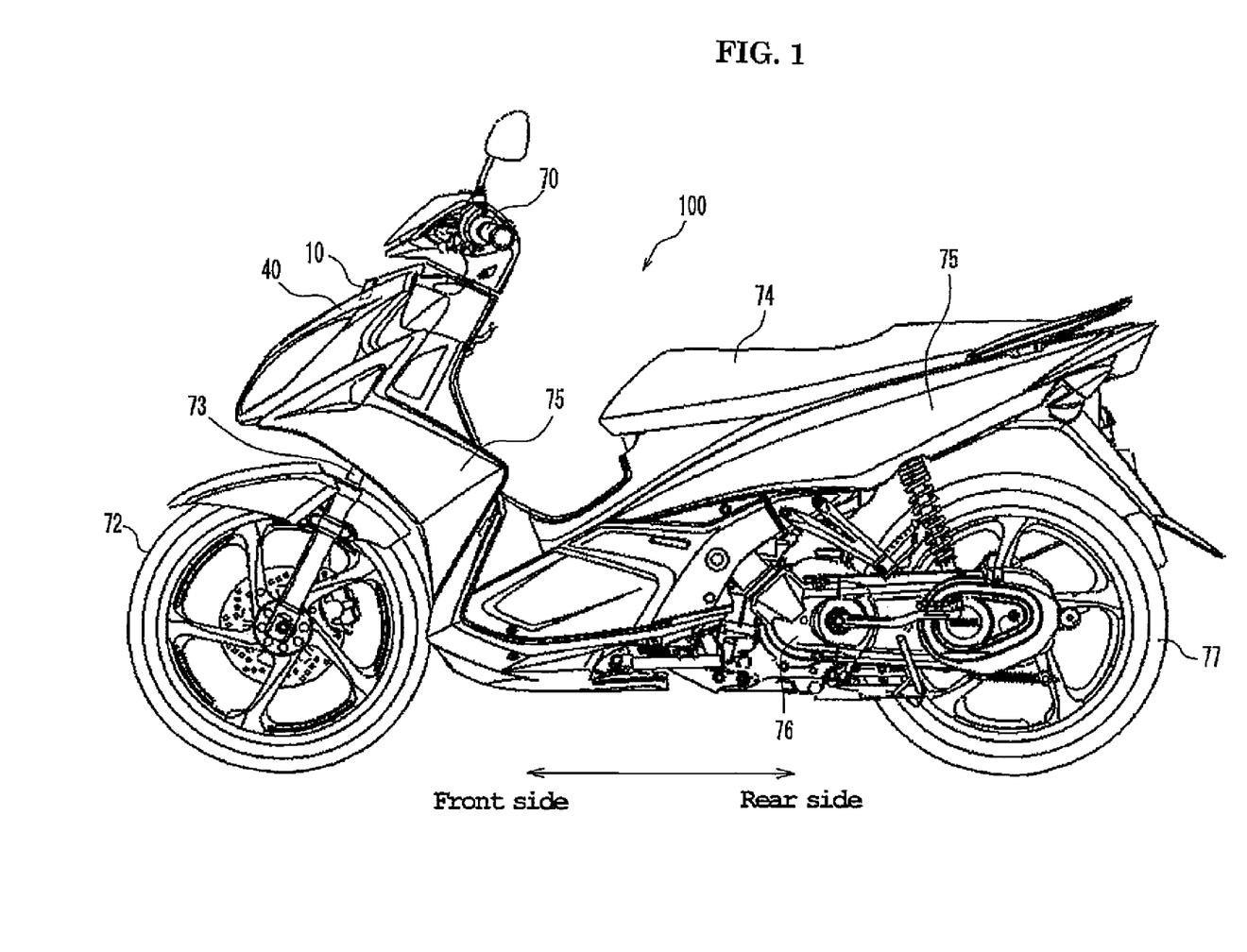
FIG. 1 is a side view of a straddle-type vehicle according to the present invention.

A straddle-type vehicle 100 according to an embodiment of the present invention is described with reference to FIG. 1. FIG. 1 is a side view of straddle-type vehicle 100.

Straddle-type vehicle 100 is a motorcycle of a so-called underbone type having a seat 74, a handlebar 70 disposed in front of seat 74, and a front wheel 72 that rotatably interlocks with handlebar 70. An engine is mounted under seat 74. Driving power of the engine is transmitted to a rear wheel 77 via a driving power transmission device 76 disposed in the rear of the engine to enable vehicle 100 to run.

An exterior front cover or cowling 40 is attached between handlebar 70 and front wheel 72 and covers a front side of vehicle 100. Cowling 40 is attached to a body frame of vehicle 100 using a fastening member. A decorative member 10 is attached and covers a fastening part of cowling 40. Decorative member 10 includes a logo or emblem with a manufacturer name, a vehicle name, or the like.

Figure 2:
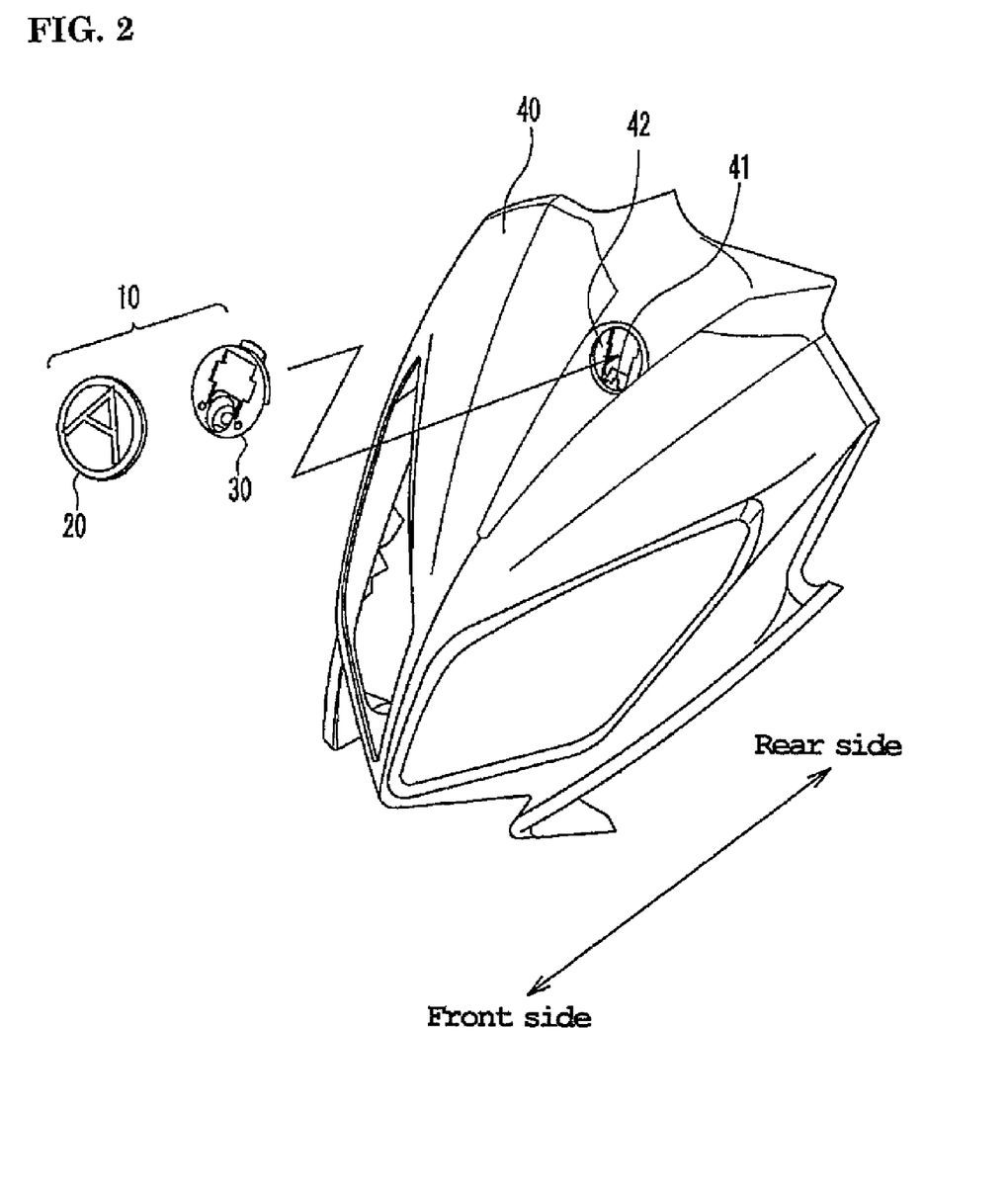
FIG. 2 an exploded perspective view of a decorative member and a cowling according to the present invention.
Figure 3A:
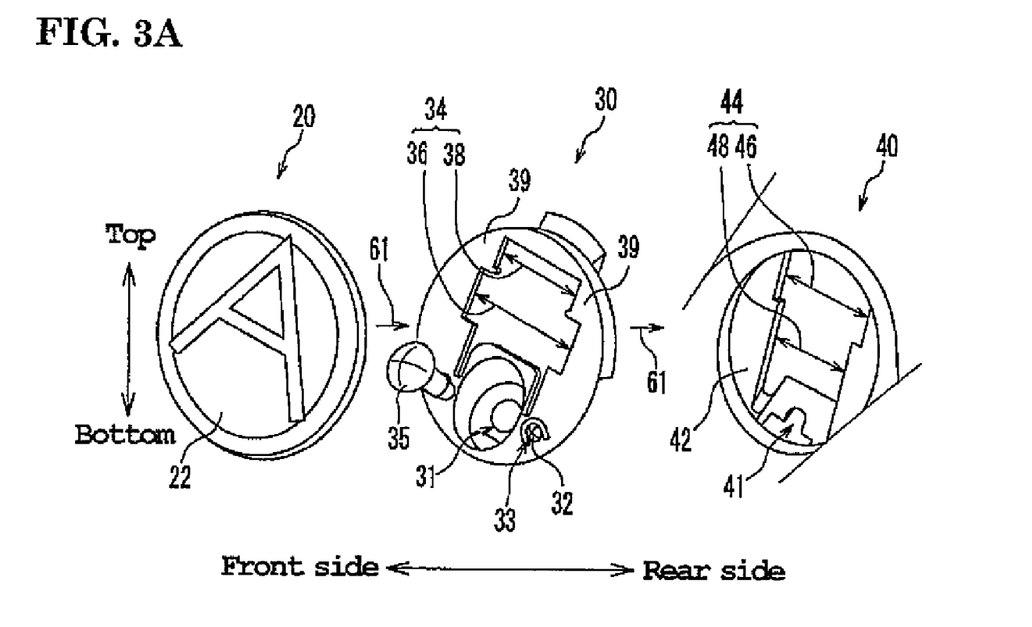
FIG. 3A is an enlarged perspective view of components of FIG. 2.

Decorative member 10 is described with reference to FIGS. 2 and 3A. FIG. 2 is an exploded perspective view of decorative member 10 and cowling 40. FIG. 3A is an enlarged perspective view of the components of FIG. 2.

Cowling 40 has a spindle shape and is made of a resin material. A front middle part of cowling 40 projects in a front direction of vehicle 100 to direct air pressure in outward directions while vehicle 100 is running. A fastening part for attaching cowling 40 to the body frame is formed in an upper middle part of cowling 40 and comprises a screw 35 (FIG. 3A) inserted in a screw hole 41. Cowling 40 is fixed to the body frame by screw 35 via screw hole 41 and a screw hole in the body frame.

Decorative member 10 is attached to cover screw hole 41 and screw 35. As illustrated in FIG. 3A, decorative member 10 comprises a lid 20 disposed to the front side of vehicle 100 and a base 30 disposed to the rear side of vehicle 100. Screw 35 is inserted in screw hole 41 via base 30. The fastening part of cowling 40 (screw 35 and screw hole 41) is covered by surrounding screw 35 exposed on a surface of base 30 with lid 20.

Thus, decorative member 10 covers the fastening parts (screw 35 and screw hole 41) of exterior cover (cowling) 40. Therefore, fastening parts 35 and 41 of cover 40 are protected against rust and the like and make the vehicle design excellent.

This embodiment illustrates one example in which cowling 40 is fixed to the body frame by the screw. However, the fastening means between cowling 40 and the body frame is not limited to a screw. For example, cowling 40 may be fixed to the body frame with a rivet made of resin or metal (a pop rivet, for example). In this case as well, the external appearance of the vehicle is improved by covering the fastening part of cowling 40 with the decorative member.

Further, the fastening part covered by decorative member 10 is not limited to the fastening part for attaching cowling 40 to the body frame. The fastening part may be, for example, a fastening part between cowling 40 and another part of the vehicle (such as side panel 75 (FIG. 1), for example). As described above, the vehicle design is improved by covering the fastening part between the cowling and another part with the decorative member. In addition, an effect of preventing theft of the part (e.g., side panel 75) can also be expected.

Moreover, the exterior cover to which decorative member 10 is attached is not limited to the cowling (front cover). Decorative member 10 may be attached to any exterior cover member. For example, decorative member 10 may cover a fastening part of side covers on left and right sides of the seat.

In this case as well, the external appearance of the vehicle is improved by covering the fastening part of the exterior cover with the decorative member.

A mounting structure of decorative member 10 is now described in detail. The inventor has developed a constitution in which the decorative member covers a fastening part of the exterior cover and is thereby utilized for a purpose other than design (rust prevention of the fastening part, for example). If the decorative member easily comes off (if it is adhered by two-sided tape, for example), the fastening part is eventually exposed, the fastening part may rust or worsen the external appearance of the vehicle. From this viewpoint, the inventor has devised a mounting structure in which the decorative member does not come off easily. Consequently, efficient protection of the fastening part of the exterior cover is provided.

As described above, decorative member 10 comprises lid 20 and base 30. As illustrated in FIG. 3A, lid 20 constitutes a main body of decorative member 10 and has an exterior surface 22 decorated, for example, with a logo of a manufacturer or the like. In this embodiment, lid 20 has a disk shape and is made of a resin material.

Figure 3B:
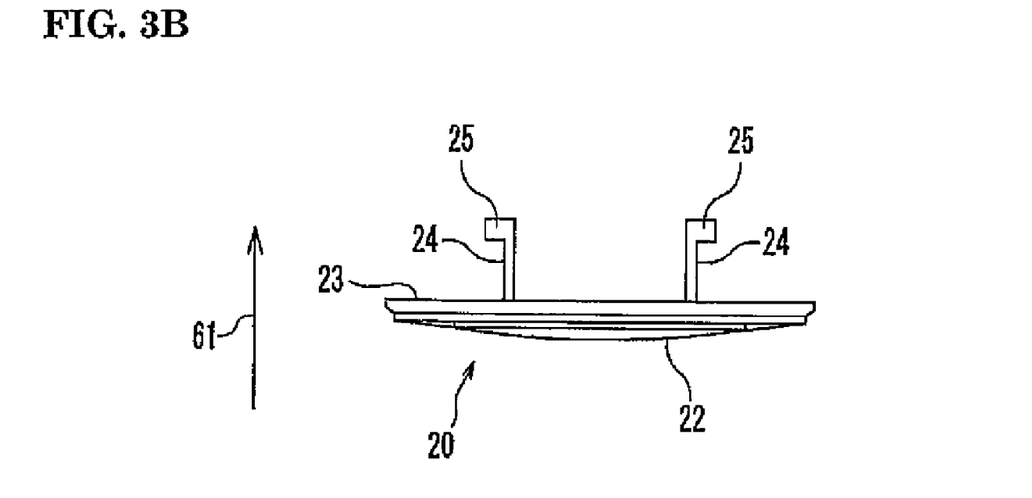
FIG. 3B is an external top view of a lid according to the present invention.

Lid 20 is illustrated in FIG. 3B when viewed from above. A pair of guide pins 24 is formed on a rear face 23 of lid 20. Guide pins 24 are a pair of rod-shaped members projecting in a mounting direction 61 (a rear direction of vehicle 100) of decorative member 10.

Base 30 is a support member for supporting lid 20 and is attached to a mounting section 42 of cowling 40. In this embodiment, base 30 is generally in a disk shape. A screw hole 31 for attaching cowling 40 to the body frame is open in a lower side of base 30. Projections 32 are provided on left and right sides of screw hole 31. U-shaped cutouts 33 are formed around projections 32 to enable projections 32 to elastically bend.

Guide pins 24 on lid 20 are inserted in exterior cover 40 via base 30 in mounting direction 61 of decorative member 10. Guide pins 24 are first inserted through a base groove 34 opened in base 30, and are then inserted through a guide groove 44 opened in exterior cover 40. A restricting member 39 for restricting removal of guide pins 24 is formed on base 30. Restricting member 39 narrows a groove width of base groove 34. Ends of guide pins 24 are caught by member 39 to restrict removal of guide pins 24 and thereby removal of lid 20.

By restricting removal of lid 20 via base 30, lid 20 does not easily come off. As a result, the fastening part of the cowling is not exposed and is protected. In order to remove lid 20, it is first necessary to remove base 30 from cowling 40. Thus, it is complicated to remove lid 20 and theft of decorative member 10 is advantageously prevented.

Figure 4:
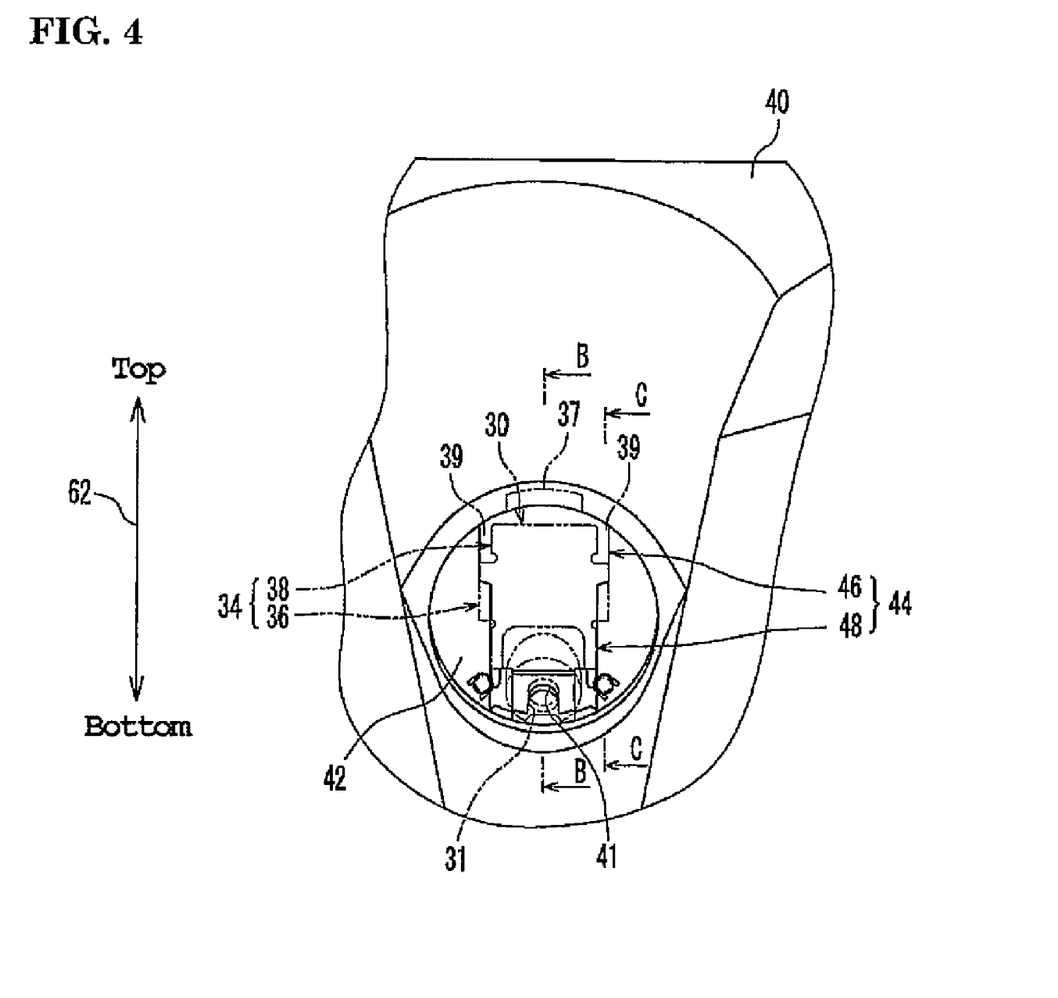
FIG. 4 is a front view illustrating a mounting section of the cowling.

A structure restricting removal of lid 20 is now described in further detail with reference to FIGS. 4 and 5. FIG. 4 is a front view illustrating a mounting section 42 of cowling 40. Here, lid 20 is omitted for easy understanding, and base 30 is illustrated in chain double-dashed lines. FIGS. 5A-5B are cross-sectional views taken through line C-C of FIG. 4.

As illustrated in FIG. 3B, each guide pin 24 of lid 20 is provided with a latch 25 whose end bends outward in a radial direction.

Meanwhile, as illustrated in FIG. 3A and FIG. 4, cowling 40 has guide groove 44 in which guide pin 24 is slidably inserted. Guide groove 44 is an opening hole extending in a vertical direction from an upper side to a lower side of mounting section 42. The width of guide groove 44 is not constant but is formed with a wide groove 46 having a wide width and a narrow groove 48 having a narrow width.

Wide groove 46 is sufficiently wide that latch 25 of guide pin 24 is not caught, while narrow groove 48 is sufficiently narrow that latch 25 is caught (guide pin 24 does not pass through narrow groove 48). In other words, wide groove 46 permits removal of guide pin 24 and narrow groove 48 restricts removal of guide pin 24. Thus, latch 25 can be selectively inserted in wide groove 46 and then hooked and slid along narrow groove 48 (along the vertical direction).

After latch 25 is inserted in wide groove 46, wide groove 46 is covered with restricting member 39 of base 30. Base 30 and restricting member 39 are described hereinafter.

A base groove 34 in which guide pins 24 of lid 20 are inserted is formed on an upper side of base 30. Base groove 34 is an opening hole extending in a vertical direction 62. Base groove 34 comprises two grooves having a different groove width from each other (a wide groove 36 and a narrow groove 38). Latch 25 of guide pin 24 is selectively inserted in wide groove 36. Thus, in the same manner as guide groove 44, base groove 34 comprises wide groove 36 that permits removal of guide pin 24 and narrow groove 38 that restricts removal of guide pin 24.

Figure 5A:
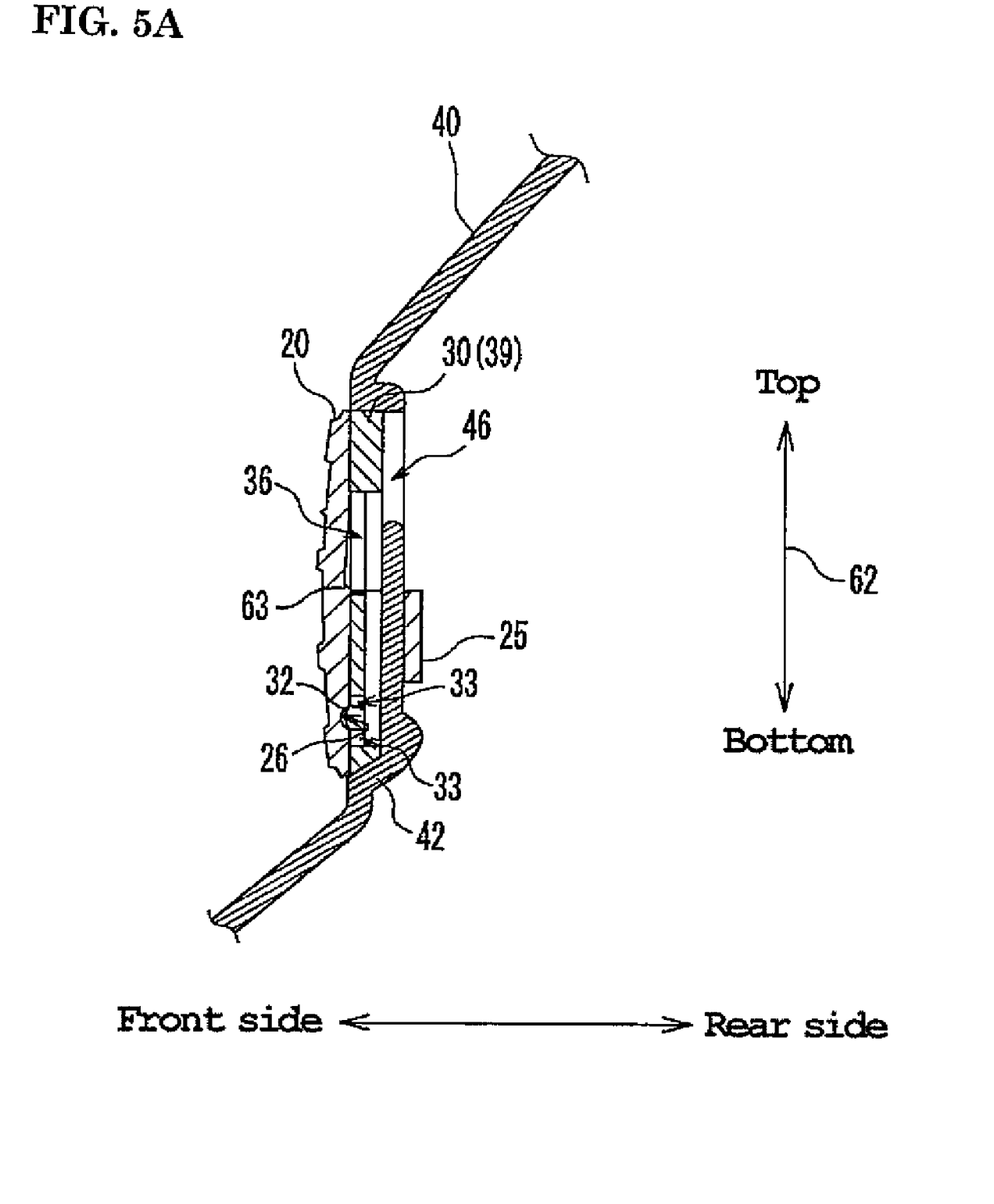
FIG. 5A is a cross-sectional view taken through line C-C of FIG. 4.
Figure 5B:
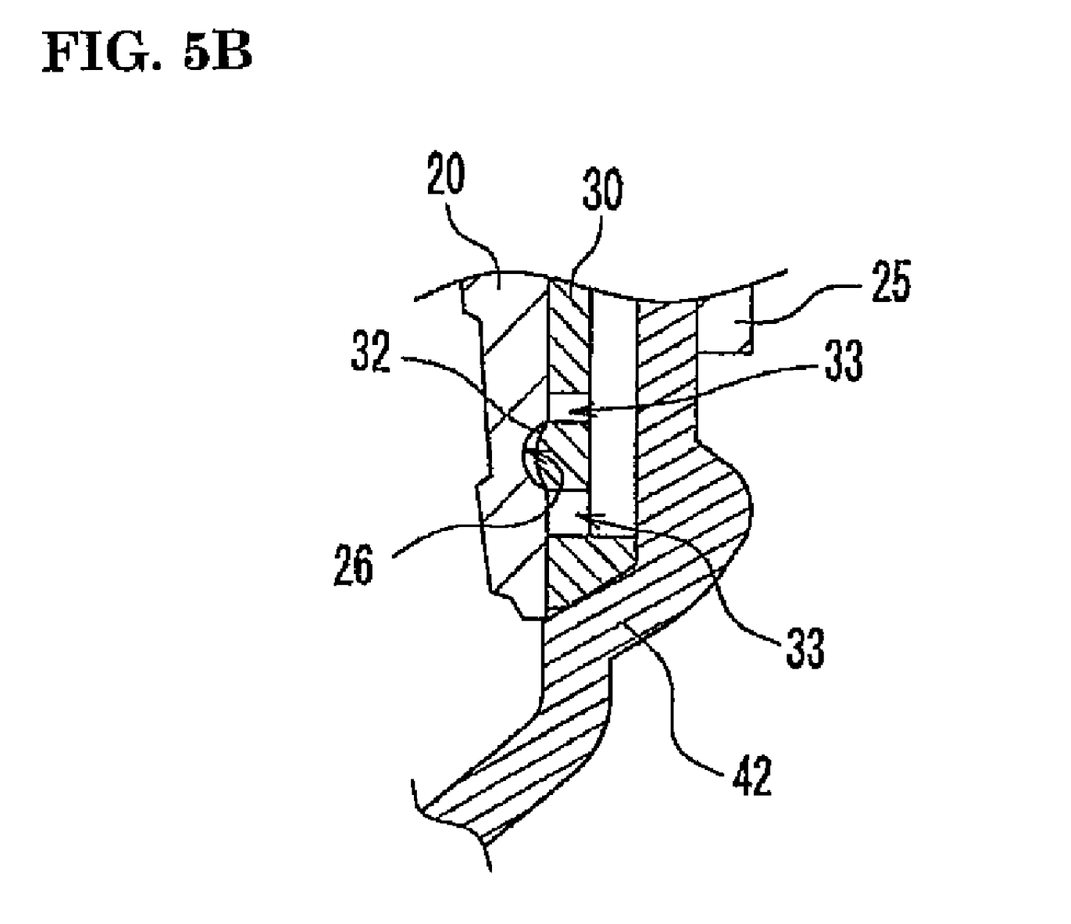
FIG. 5B is an exploded cross-sectional view of a portion of FIG. 5A.

However, as illustrated in FIGS. 4 and 5A-5B, wide groove 36 of base groove 34 and wide groove 46 of guide groove 44 are formed in positions away from each other in vertical direction 62 (in the sliding direction of guide pin 24). More specifically, wide groove 36 of base groove 34 is opened in a vicinity of a middle part of base 30 while wide groove 46 of guide groove 44 is opened in a vicinity of an upper end of mounting section 42.

Since the positions in which wide grooves 36 and 46 are formed are shifted along sliding direction 62, wide groove 46, through which guide pin 24 is put in or out, can be covered with restricting member 39 of base 30. Thus, latch 25 is caught by restricting member 39 and guide pin 24 cannot be pulled out. In other words, restricting member 39 is an insertion 39 covering wide groove 46 of guide groove 44 that restricts removal of lid 20 from cowling 40 (a removal restriction structure).

According to this structure, the decorative member (lid 20) can be attached to cowling 40 without a fixing means such as an adhesive or a double-sided tape. Therefore, the decorative member (lid 20) can be repeatedly attached and removed, and user satisfaction is increased. In addition, since adhesives or double-sided tapes are not used, cost is relatively reduced.

Further, when decorative member 10 is removed, the space widely opened by guide groove 44 can be effectively used as a workspace. Maintenance performance is thereby improved. For example, a space for a tool can be secured by using the space of guide groove 44 when a headlamp is fastened. Or, the space can be used to insert a tool such as a bolt necessary to attach the cowling or other members.

Wide groove 36 of base groove 34 and wide groove 46 of guide groove 44 must be separated enough to restrict pulling in and out of the guide pin. However, wide groove 36 and wide groove 46 need not be completely apart from each other. As illustrated in FIG. 4, wide grooves 36 and 46 may partly overlap in sliding direction 62.

The material composing base 30 needs only to be able to function as a support member and is not limited in particular. A material that also functions as a vibration isolation member (dampener), such as polypropylene (typical plastic), hard rubber, or urethane, for example, is preferable. By making base 30 a vibration isolation member, lid 20 and cowling 40 are prevented from rubbing against each other. Accordingly, noise generation, a powdery surface between members, or the like caused by rubbing is prevented.

Moreover, base 30 only needs to be in a shape which can support lid 20 and is not limited in particular. However, base 30 preferably has a height such that lid 20 and cowling 40 do not contact each other while guide pin 24 slides. In this manner, damage caused by contact between cowling 40 and lid 20 is avoided. In addition, since it becomes easy to attach lid 20, ease of assembly is improved.

As illustrated in FIGS. 5A-5B and 3A, projection 32 of base 30 can bend by virtue of cutout 33 on the lower side. A recess 26 formed in rear face 23 of lid 20 faces projection 32. The positions of base 30 and lid 20 are fixed by fitting projection 32 to recess 26. This provides an advantage in that rattling caused by vibrations of the vehicle body is prevented. Further, the lower side of lid 20 is elastically pushed up because projection 32 bends. Accordingly, the lower side of lid 20 is in an opening direction and the upper side of lid 20 is in a closing direction with a fulcrum 63 of lid 20 at the center. Consequently, the appearance of decorative member 10 is enhanced. Still further, base 30 and lid 20 are concentrically disposed with fulcrum 63 at the center such that the exterior appearance of decorative member 10 is excellent. While base 30 and lid 20 are shown as having a disk shape, the invention is not limited to this example. So long as the base and the lid have the same shape, the same operational effect is obtained.

Figure 6A:
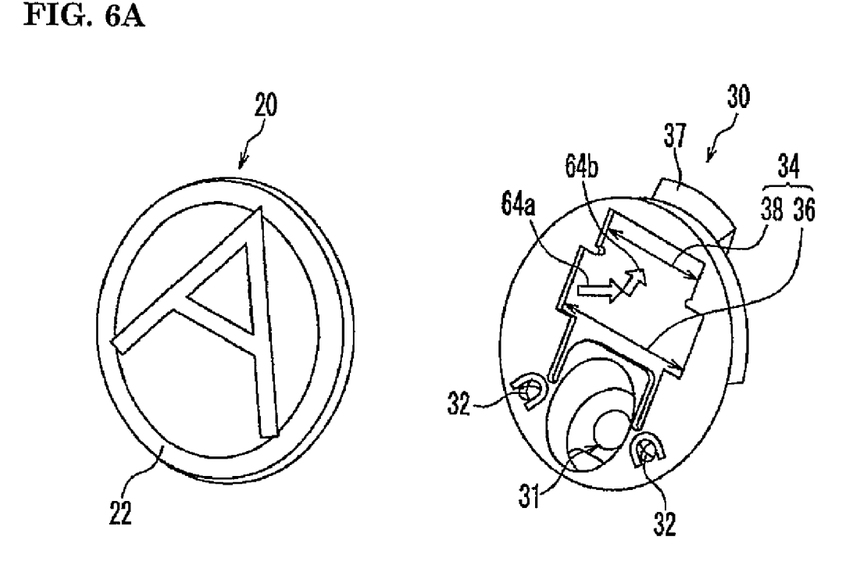
FIGS. 6A-6B illustrate a method of attaching the lid and a base.
Figure 6B:
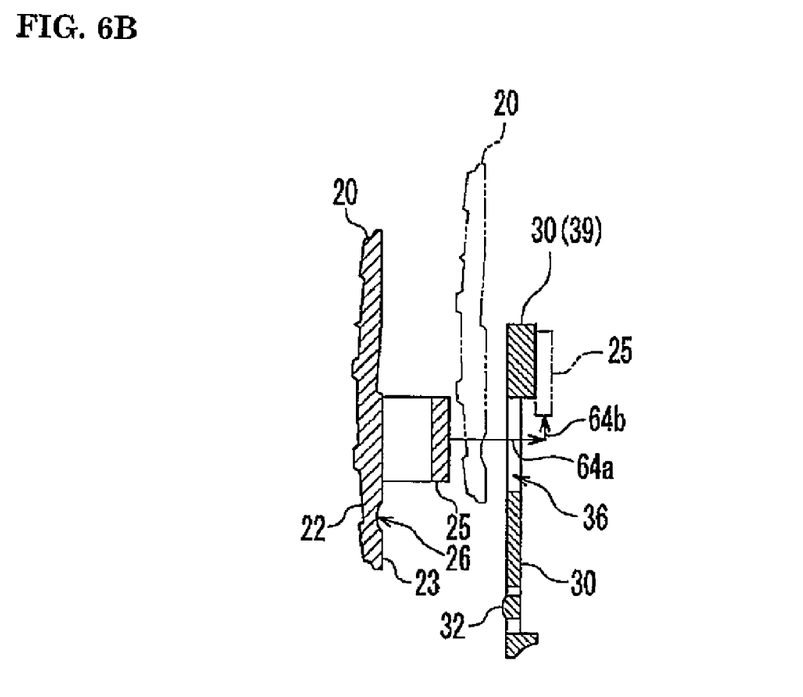
Figure 7A:
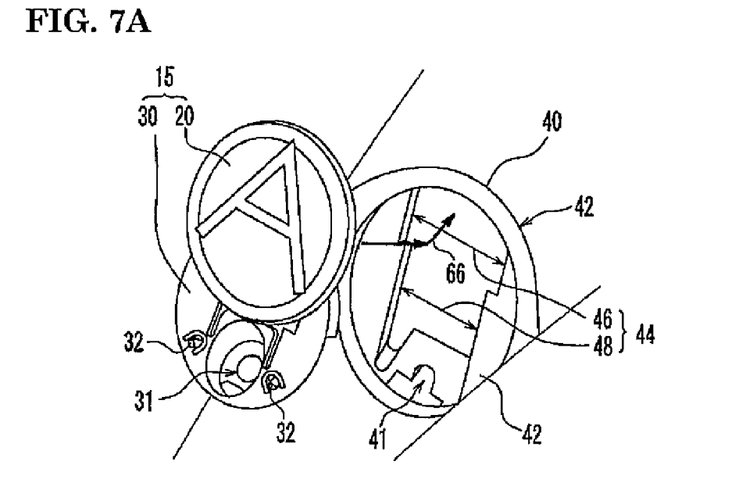
FIGS. 7A-7C illustrate a method of attaching a decorative member to the cowling.
Figure 7B:
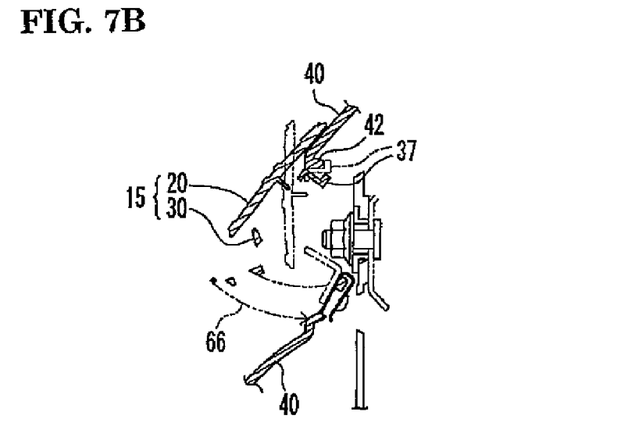
Figure 7C:
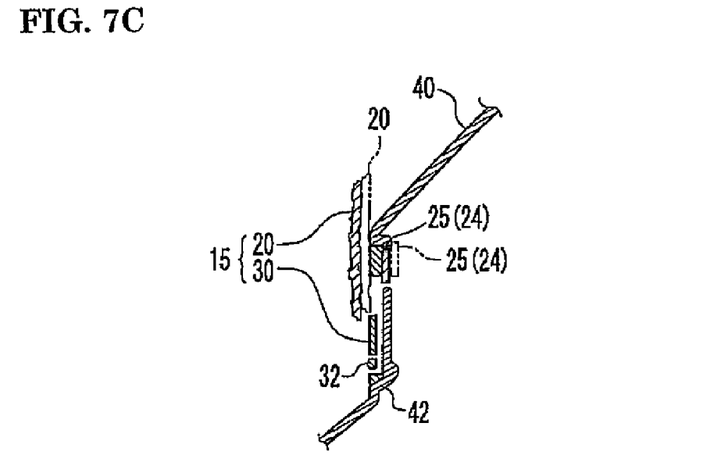
Figure 8A:
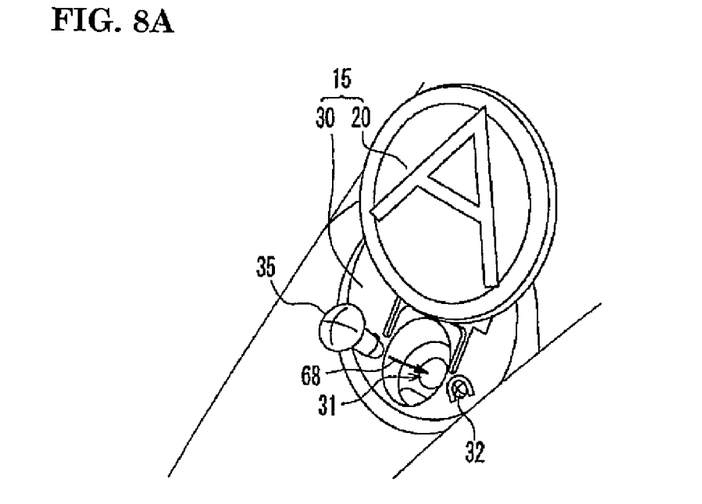
FIGS. 8A-8C illustrate a method of attaching the decorative member to the cowling.
Figure 8B:
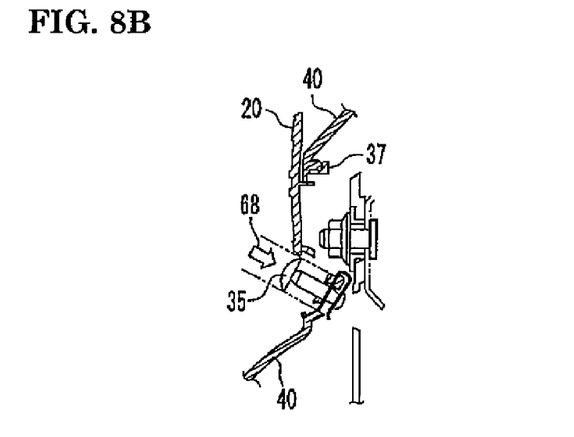
Figure 8C:
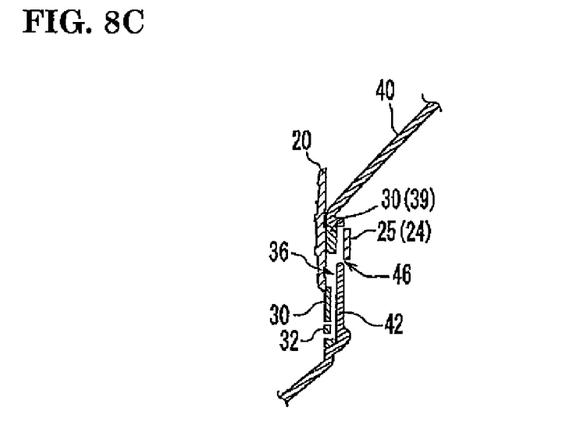
Figure 9A:
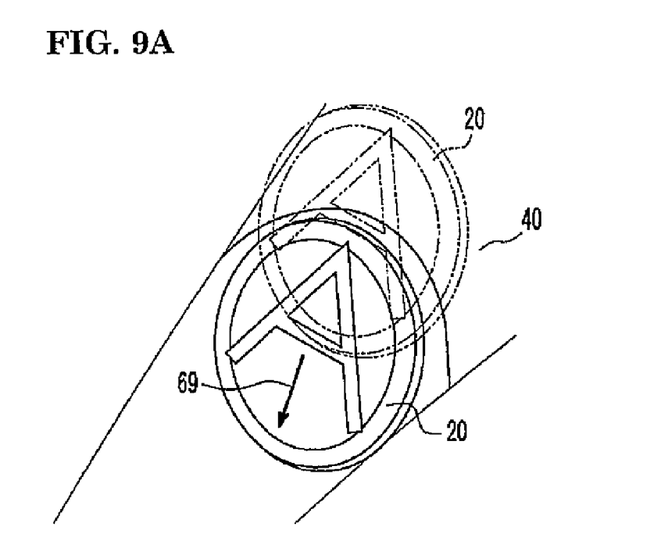
FIGS. 9A-9C illustrate a method of attaching the decorative member to the cowling.
Figure 9B:
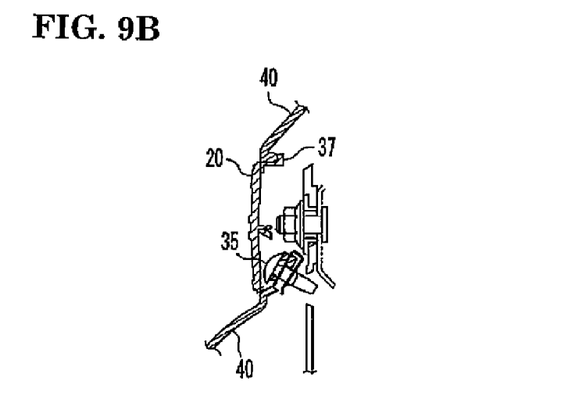
Figure 9C:
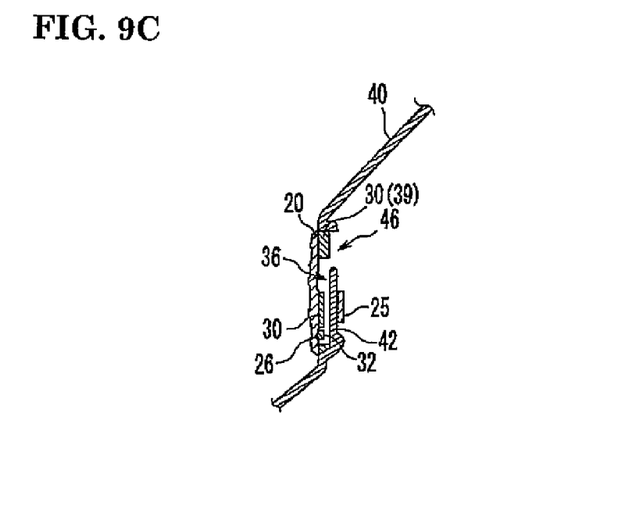

An assembling method of decorative member 10 of the embodiment is now described with reference to FIGS. 6-9. Lid 20 and base 30 are first assembled to form a decorative member assembly (FIG. 6). The decorative member assembly is then attached to the mounting section of cowling 40 (FIGS. 7-9). FIGS. 7B, 8B and 9C are cross-sectional views of FIGS. 7A, 8A and 9A taken through line B-B of FIG. 4. FIGS. 7C, 8C, 9C and 6B are cross-sectional views of FIGS. 7A, 8A, 9A and 6A taken through line C-C of FIG. 4.

As illustrated in FIGS. 6A-6B, when lid 20 and base 30 are assembled, guide pin 24 of lid 20 is first inserted in wide groove 36 of base groove 34 in the direction of arrow 64a. Latch 25 of guide pin 24 is then hooked and, at the same time, guide pin 24 is slid upward along narrow groove 38 in the direction of arrow 64b.

As a result, latch 25 of guide pin 24 is hidden in a back side of base 30 (FIG. 6B), and screw hole 31 formed on the lower side of base 30 for attaching cowling 40 is exposed. In this manner, a decorative member assembly 15 comprising the assembled lid 20 and base 30 is formed.

As illustrated in FIG. 7A, decorative member assembly 15 with screw hole 31 exposed is then inserted in mounting section 42 in the direction of arrow 66. More specifically, as illustrated in FIG. 7B, a latch 37 provided at an upper end of base 30 is inserted in an upper end of mounting section 42 of cowling 40. Decorative member assembly 15 is turned around latch 37 and inserted in mounting section 42 as indicated by arrow 66. As a result, as illustrated in FIG. 7C, guide pin 24 is disposed to face and is pushed into wide groove 46 of guide groove 44.

As illustrated in FIGS. 8A-8B, screw 35 is then inserted and fastened into screw hole 31 exposed on the lower side of base 30 in the direction of arrow 68. In this manner, cowling 40 is attached to the body frame and, at the same time, base 30 is attached to cowling 40. When base 30 and cowling 40 are fastened, the opening through which guide pin 24 is put in or out (wide groove 46 of guide groove 44) is covered with part 39 of base 30 (FIG. 8C). Consequently, it is not possible to pull out guide pin 24 and removal of lid 20 is restricted. Thus, a structure for preventing lid 20 from coming off (a structure in which guide pin 24 cannot be pulled out) is constructed at the same time as assembling base 30 and cowling 40.

Next, as illustrated in FIG. 9A, latch 25 of guide pin 24 is hooked and, at the same time, guide pin 24 (and thereby lid 20) is slid downward along narrow groove 48 in the direction of arrow 69. As a result, as illustrated in FIG. 9B, the fastening part (screw 35) of cowling 40 exposed on the lower side of base 30 is covered with lid 20. In this manner, the process for attaching decorative member 10 to cowling 40 is completed. As illustrated in FIG. 9C, projection 32 of base 30 is fitted in recess 26 of lid 20, and thereby the positions thereof are fixed.

According to the attaching method of decorative member 10 as described above, lid 20 is attached to cowling 40 via base 30. In addition, the structure for restricting removal of lid 20 from cowling 40 (the removal restriction structure) is achieved by assembling base 30 to cowling 40. Thus, in order to cancel the removal restriction of lid 20, base 30 must first be removed from cowling 40. This makes it extremely complicated to remove decorative member 10. Therefore, even if there is a possibility that lid 20 is stolen (for example, where lid 20 is decorated with an emblem of a famous brand or an expensive ornament), it takes some time to remove lid 20. As a result, the possibility of theft of lid 20 is minimized.

Moreover, according to the constitution above, if lid 20 is not slid, the fastening part (screw 35) between base 30 and cowling 40 is not exposed. Accordingly, the anti-theft effect for lid 20 is further enhanced.

A tool such as a screwdriver is preferably used to fasten screw 35 in order to firmly fasten base 30, cowling 40 and the body frame. Thus, a tool is required to remove base 30. Accordingly, it takes some time to remove base 30 and the anti-theft effect of lid 20 is still further enhanced.

The present invention has been described with reference to one embodiment. However, the present invention is not limited to this embodiment, and may be variously modified.

For example, while guide groove 44 of cowling 40 extends straight in the vertical direction in the embodiment described above, the invention is not limited to this constitution. Guide groove 44 of cowling 40 only needs to be in a shape in which guide pin 24 can be slidably inserted, and is not limited to a shape extending straight.

Figure 10A:
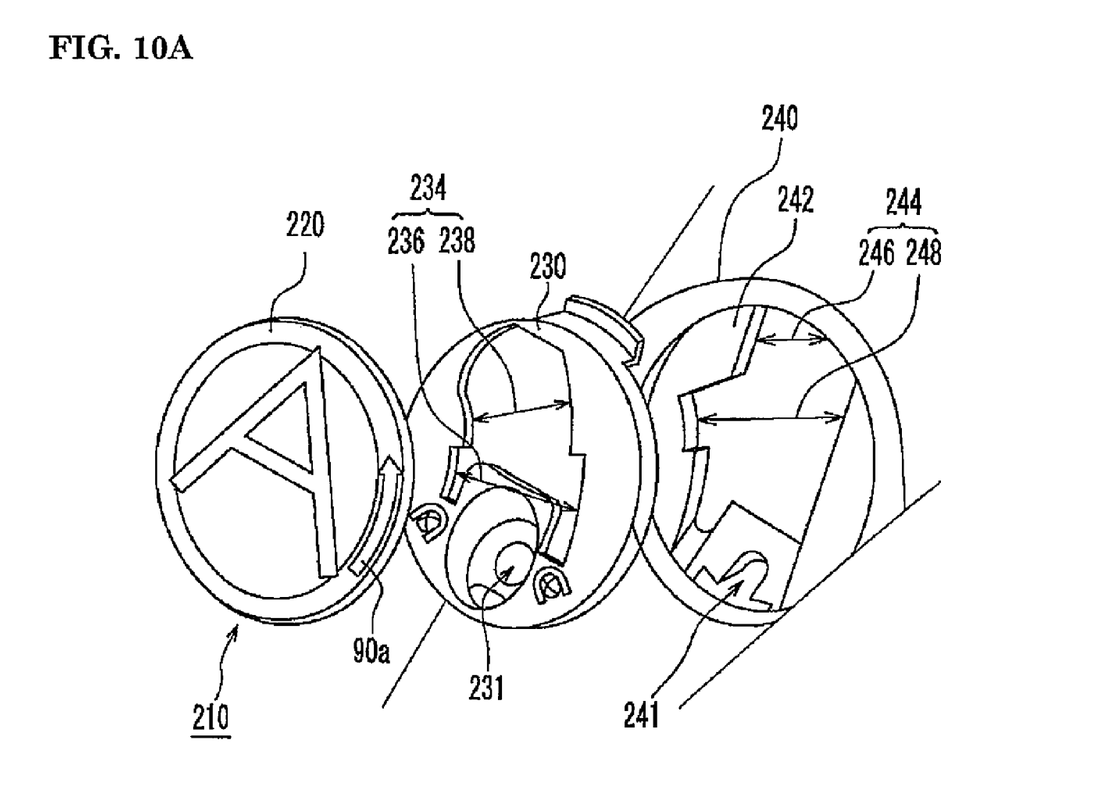
FIGS. 10A-10C illustrate a mounting structure of a decorative member having a shape in which a guide groove of a cowling bends while extending.
Figure 10B:
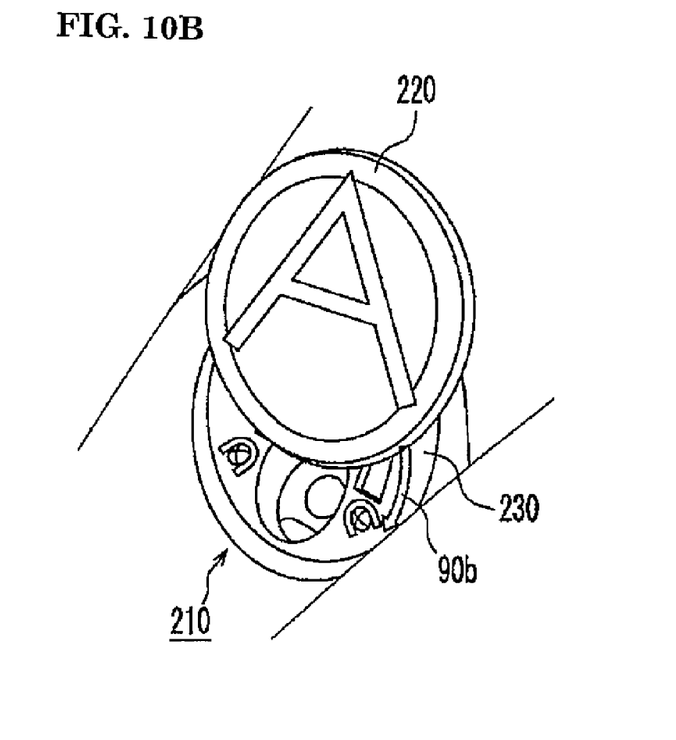
Figure 10C:
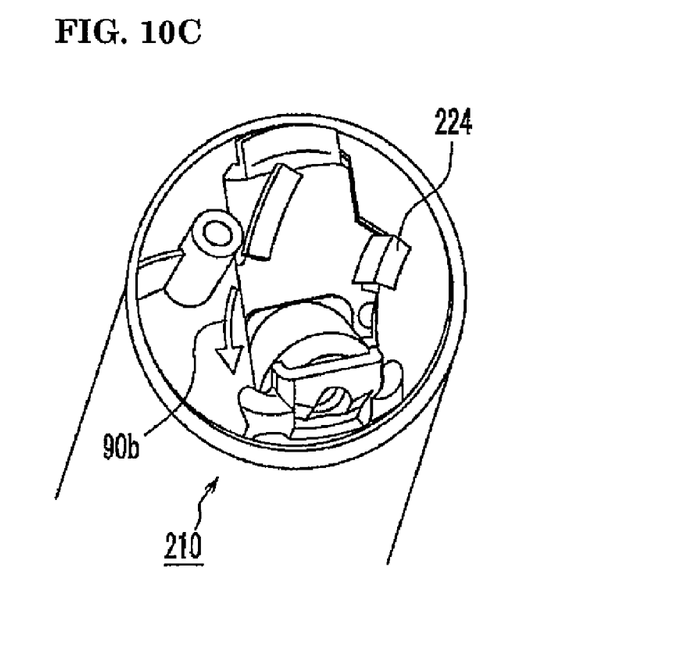

In this regard, FIGS. 10A-10C illustrate a decorative member 210 having a mounting structure in which a guide groove 244 of a cowling 240 bends while extending. A lid 220 follows the bending shape of guide groove 244 and slides, forming a gentle curve (see arrows 90a and 90b). As illustrated, guide groove 244 has a bending and extending shape. However, if the positions of wide grooves 246 and 236 of guide groove 244 and a base groove 234 are shifted in a sliding direction, a structure for preventing lid 220 from coming off (a structure in which a guide pin 224 cannot be pulled out) can be constructed. Therefore, theft of lid 220 can be prevented.

Further, the sliding direction of lid 20 is not limited to the vertical direction. For example, lid 20 may be constituted to be slidable in the width direction or in the circumferential direction.

Figure 11A:
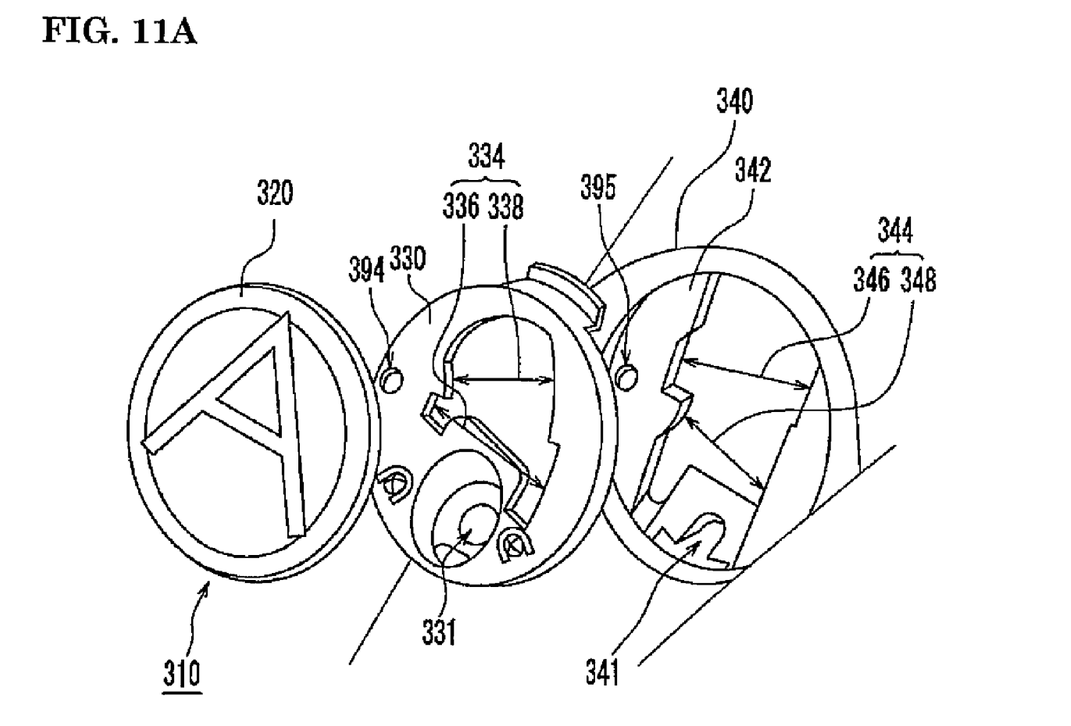
FIGS. 11A-11C illustrate a mounting structure of a decorative member in which a lid is slidably constituted.
Figure 11B:
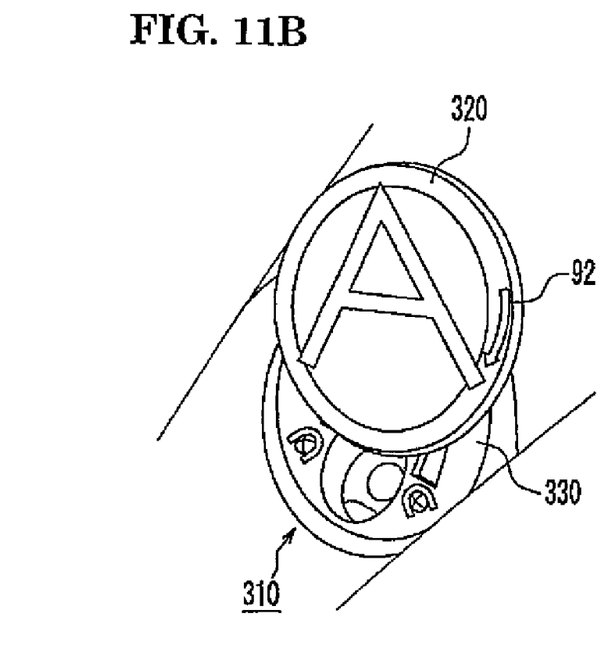
Figure 11C:
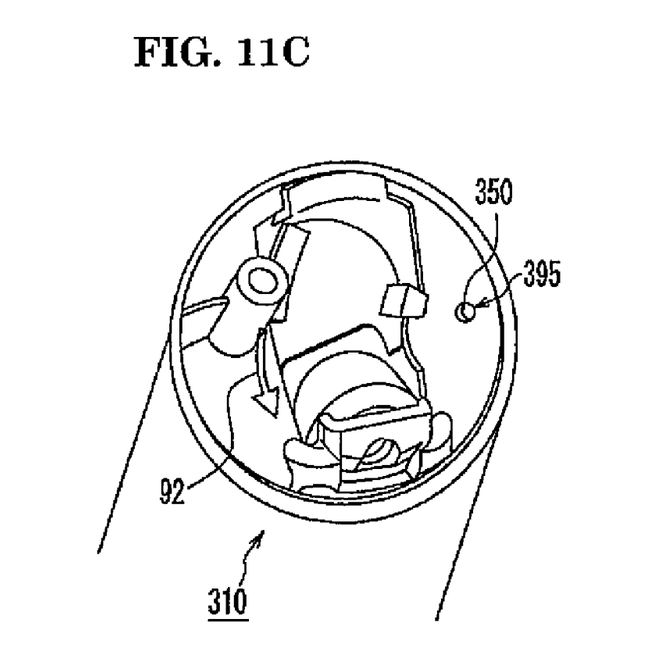

For example, FIGS. 11A-11C illustrate a decorative member 310 having a mounting structure with a lid 320 rotatably constituted. A projection 350 passing through a hole 394 of a base 330 and a hole 395 of a cowling mounting section 342 is formed on a back side of lid 320. Lid 320 is rotated around projection 350 in the direction of arrow 92 as a rotational shaft. In such a constitution, if the positions of wide grooves 346 and 336 of a guide groove 344 and a base groove 334 are shifted in a sliding direction (in a rotational direction), lid 320 is prevented from coming off and theft of lid 320 is prevented.

A "straddle-type vehicle" as referred to in this specification is not limited to a vehicle in which a rider sits by straddling a seat, but also includes a vehicle in which a rider sits by closing the legs (such as a vehicle of a scooter type). Further, the present invention is applicable not only to a motorcycle of an underbone type but also to any vehicle having a decorative member. For example, the invention is applicable to a four-wheel buggy (ATV: all terrain vehicle) and a snowmobile.

According to the present invention, a straddle-type vehicle is provided with a decorative member that a user can repeatedly use and that is utilized for a purpose other than design.

The invention claimed is:

1. A straddle-type vehicle comprising:
   an exterior cover; and
   a decorative member covering a fastening part of the exterior cover, wherein the decorative member comprises:
      a lid including a decorated exterior surface, and
      a base attached to the exterior cover to support the lid,
   the lid is attached to the exterior cover via the base,
   removal of the lid from the exterior cover is restricted by assembly of the base in the exterior cover,
   a guide pin is provided on a back side of the lid and arranged to be inserted in the exterior cover,
   a restricting member is provided on the base and arranged to restrict removal of the guide pin from the base,
   the exterior cover includes a guide groove in which the guide pin is slidably inserted, and
   the guide groove includes a narrow groove including a width arranged to restrict removal of the guide pin, and a wide groove including a width arranged to permit removal of the guide pin.

2. The straddle-type vehicle according to claim 1, wherein the restricting member on the base is arranged to cover the wide groove of the guide groove.

3. The straddle-type vehicle according to claim 2, wherein the base includes a base groove in which the guide pin is slidably inserted,
   the base groove comprises:
      a narrow groove including a width arranged to restrict removal of the guide pin, and
      a wide groove including a width arranged to permit removal of the guide pin, and
   the wide groove of the base groove and the wide groove of the guide groove are arranged in positions spaced away from each other in a sliding direction of the guide pin.

4. The straddle-type vehicle according to claim 2, wherein the base has a height such that the lid does not contact the exterior cover when the guide pin slides.

5. The straddle-type vehicle according to claim 1, wherein the fastening part of the exterior cover is constituted such that a fastening member can be inserted through the exterior cover and a body frame of the vehicle, and the fastening member is covered with the lid.

6. The straddle-type vehicle according to claim 1, wherein the base is fixed on the exterior cover by a fastening member attached by using a tool.

7. The straddle-type vehicle according to claim 2, wherein the guide pin is slidably inserted along a vertical direction of the vehicle.

8. The straddle-type vehicle according to claim 1, wherein the base comprises a vibration isolation member.

9. The straddle-type vehicle according to claim 8, wherein the base is made of polypropylene, hard rubber or urethane.

10. The straddle-type vehicle according to claim 1, wherein the exterior cover is a cowling covering a front side of the vehicle.

11. The straddle-type vehicle according to claim 1, wherein the lid and the base are generally in a disk shape.

12. The straddle-type vehicle according to claim 1, wherein the base is provided with a projection arranged to fit in a recess provided in the lid to fix the positions of the base and the lid.

13. The straddle-type vehicle according to claim 12, wherein a cutout is provided in the base near the projection such that the projection can bend.

14. The straddle-type vehicle according to claim 2, wherein the guide groove of the exterior cover extends straight in a vertical direction.

15. The straddle-type vehicle according to claim 2, wherein the guide groove of the exterior cover has a bending shape to form a gentle curve.

16. The straddle-type vehicle according to claim 2, wherein the guide pin of the lid is slidable in a vertical direction.

17. The straddle-type vehicle according to claim 2, wherein the guide pin of the lid is slidable in a rotational direction.

18. The straddle-type vehicle according to claim 1, wherein the vehicle is an underbone-type motorcycle.

* * * * *